United States Patent [19]

Shikada et al.

[11] Patent Number: 5,055,282
[45] Date of Patent: Oct. 8, 1991

[54] METHOD OF DECOMPOSING AMMONIA USING A RUTHENIUM CATALYST

[75] Inventors: Tsutomu Shikada; Minoru Asanuma; Takao Ikariya, all of Tokyo, Japan

[73] Assignee: NKK Corporation, Tokyo, Japan

[21] Appl. No.: 594,450

[22] Filed: Oct. 9, 1990

Related U.S. Application Data

[60] Division of Ser. No. 546,679, Jun. 29, 1990, Pat. No. 5,002,921, which is a continuation of Ser. No. 329,783, Feb. 9, 1989, abandoned.

[30] Foreign Application Priority Data

Oct. 30, 1987 [JP] Japan ............................ 62-277156
Oct. 21, 1988 [JP] Japan ............. PCT/TP88/01075

[51] Int. Cl.$^5$ ........................... C01B 3/04; C01C 1/12
[52] U.S. Cl. .................................. 423/351; 423/237; 423/658.2
[58] Field of Search ...................... 423/237, 351, 658.2

[56] References Cited

U.S. PATENT DOCUMENTS 3,840,389 10/1974 Kobylinski et al. .............. 423/213.5
3,980,589 9/1976 Murrell et al. ...................... 502/328
4,179,407 12/1979 Iiyama et al. ....................... 423/351

FOREIGN PATENT DOCUMENTS 2443713 3/1975 Fed. Rep. of Germany ...... 423/237
71373 6/1977 Japan ................................... 423/237

Primary Examiner—Wayne A. Langel
Attorney, Agent, or Firm—Moonray Kojima

[57] ABSTRACT

For carrying out a process for decomposing, into hydrogen and nitrogen, ammonia recovered from a coke oven gas by combining a catalytic combustion of ammonia and a catalytic decomposition of ammonia utilizing a waste heat by said combustion, a basic compound as a required catalyzer is added to ruthenium supported on alumina, or ruthenium as a required catalyzer is supported on a basic compound, whereby ammonia may be decomposed effectively at ranges of low temperatures as not more than 500° C.

6 Claims, No Drawings

METHOD OF DECOMPOSING AMMONIA USING A RUTHENIUM CATALYST

This is a division of application Ser. No. 546,679, filed June 29, 1990, now U.S. Pat. No. 5,002,921, which is a continuation of Ser. No. 329,783, filed Feb. 9, 1989, abandoned.

TECHNICAL FIELD

The present invention relates to a catalyzer for decomposing ammonia, which has been recovered from a coke oven gas, into hydrogen and nitrogen at low temperatures as 400° to 500° C.

BACKGROUND OF THE INVENTION

A gas generated in a coke oven contains ammonia of 6 to 10 g/Nm$^3$, and it must be removed since it causes corrosion in pipings of the coke oven gas (called as "COG" hereinafter) and generates NOx at combustion of COG. As methods of removing ammonia from COG, in general COG is washed with dilute sulfuric acid and ammonium sulfate is recovered. However, this method is very poor in payability, because fertilizers of ammonium sulfate have been very little required nowadays, and a market price has largely fallen accordingly, and the treatment of ammonia by the production of ammonium sulfate is not valuable industrially. Presently, the production of ammonium sulfate has been cut down, and there are other ammonia treatments, for example, Phosam method which produces liquid ammonia of high purity; Koppers method which separates ammonia and burns it directly; or Carl Still method which burns ammonia under the presence of a catalyzer. But, since these methods are not perfectly satisfactory, either, in view of economical treatments, various improvements have been attempted, and at the same time new processes of ammonia treatments have been developed vigrously.

Under these circumstances, the inventors developed and proposed a treating method of ammonia recovered from COG, which comprised, burning ammonia catalytically under the presence of air to change into nitrogen and water, decomposing it catalytically by a heat caused by said burning, and recovering hydrogen.

There have been up to now submitted many reports with respect to catalyzers useful to ammonia decomposition. For example, "CATALYSIS Science and Technology" describes, vol. 1, page 118 (1981), useful catalysis elements such as molybdenum, tungsten, rhenium, iron, ruthenium, cobalt, rhodium, nickel, platinum, copper and vanadium The ammonium decomposition has been utilized industrially to production of an atmospheric gas to be used to brighten annealings of stainless steel or nickel steels and the catalyzers thereof are $Fe_2O_3$—$Al_2O_3$, NiO—$SiO_2.Al_2O_3$ and Pt—$Al_2O_3$. These catalyzers are used at space velocity of 500 to 1000ml/ml.h and at temperatures of 500° to 900° C., substantially 700° to 1200° C. But, foregoing catalyzers such as $Fe_2O$—$Al_2O_3$, NiO—$SiO_2.Al_2O_3$, pt—$Al_2O_3$ and Ru—$Al_2O_3$ have problems as mentioned under, requiring high temperatures as 700° to 1200° C. for decomposing ammonia perfectly:

1) Heat resistant materials are required for reactors.
2) Energy is much consumed for maintaining reaction temperature high.

The present invention has been developed for settling these problems about the prior art, and is to propose a catalyzer for decomposing ammonia into hydrogen and nitrogen at low temperature ranges.

DISCLOSURE OF THE INVENTION

The inventors have succeeded in making an ammonia decomposition catalyzer which may decompose ammonia at ranges of low temperature of not more than 500° C. and change into nitrogen and hydrogen in a process which combines a catalytic combustion of ammonia and a catalytic decomposition of ammonia utilizing a waste heat generated by said catalytic combustion.

It has been known that ruthenium is useful to the decomposition reaction of ammonia, for example, "J. Am. Chem. Soc." refers to Ru—$Al_2O_3$ in vol. 76, page 4201 (1954), and "Trans. Faraday Soc." describes ruthenium film in vol. 56, page 144 (1960). In view of these matters, an important characteristic of the invention is present in that basic compounds are contained in the catalyzers, whereby the ammonia decomposition activity of ruthenium is improved considerably, and this tendency is remarkable at low temperatures of not more than 500° C.

The present catalyzer will be prepared by two methods of (1) adding the basic compound as a third element to R—$Al_2O_3$, and
(2) employing the basic compound as a carrier.

A first reference will be made to the method (1). The compounds referred to herein are oxides of alkali metals such as $Li_2O$, $Na_2O$, $K_2O$, $Rb_2O$ or $Cs_2O$, inorganic salts of carbonate, hydroxide, nitrate of alkali metals, organic salts of acetates of alkali metals, oxides of alkali earth metals of MgO, CaO, SrO or BaO, inorganic salts of carbonate, hydroxide, nitrate of alkaline earth metals, and organic salts of acetate of alkaline earth metals. The basic compound and ruthenium are mixed together, such as by dissolving in water, and then impregnated into the alumina carrier. When ruthenium is supported on alumina, available ruthenium compounds are, for example, water soluble such as ruthenium chloride, ruthenium nitrate or ruthenium acetate, or soluble in an organic solvent such as ruthenium carbonyl ($Ru_3(CO)_{12}$) Ordinary impregnation methods may be utilized to loading the basic compound and ruthenium.

It is preferable to contain 0.1 to 2.0 wt % ruthenium in the catalyzer, and contain 1 to 20 wt % basic compound calculated as oxide.

The basic compounds used as the carrier in the method (2) are oxides, carbonate of alkaline earth metals, or mixed oxide compound of alumina, silica gel, or titania together with said oxides and carbonate. Ruthenium is preferably contained in an amount of 0.1 to 2.0 wt % in the catalyzer.

The composition of the catalyzer prepared as stated above is dried in air at the temperature of 90° to 150° C. for 12 to 36 hours. If required, it may be calcinated thereafter by an ordinary process. It is preferable that the calcination is performed out by heating at the temperature of 400° to 600° C. for 1 to 10 hours in nitrogen or air.

The catalyzer composition does not require a pretreatment as a reduction before performing the ammonia decomposition, because the catalyzer is reduced gradually due to hydrogen generated by the ammonia decomposition. If the decomposition activity more stable than at beginning of the reaction is required, the composition is heat-treated, e.g., in a steam of hydrogen at the temperature of more than 200° C., preferably more than 300° C. for 1 to 5 hours.

Samples were taken as follows with respect to the present catalyzers, and will be shown together with results of experiments.

(1) Preparation of the catalyzer

Ruthenium trichloride ($RuCl_3.3H_2O$) of 1.03g and potassium nitrate of 10.7g were dissolved in water of about 200 ml, and alumina of 94.5g granulated into 20 to 40 meshes (DC-2282 made by Dia-catalyst) was supplied thereto, evaporated and dried. Subsequently, the above treated substance was dried in the air at the temperature of 120° C. for 24 hours, and calcinated in the air at the temperature of 500° C. for 4 hours, and further treated in a steam of hydrogen at the temperature of 400° C. for 3 hours to obtain a catalyzer (1).

Alumina of 99.5g was prepared without using potassium nitrate in the same manner as the catalyzer (1) to obtain a catalyzer of a comparative example (a).

A catalyzer ($Ru—K_2O—Al_2O_3$ = 0.5:2:97.5 and 0.5:10:89.5) with different content of potassium from the catalyzer (1), was prepared in the same process as the catalyzer (1) to obtain catalyzers (2) and (3).

Catalyzers ($Ru—K_2O—Al_2O_3$ = 0.1:5:94.9 and 2:5:93) with different content of ruthenium from the catalyzer (1), were prepared in the same process as the catalyzer (1) to obtain catalyzers (4), (5).

Catalyzers ($Ru—Li_2O—Al_2O_3$ = 0.5:5:94.5, $Ru—Na_2O—Al_2O_3$ = 0.5:5:94.5 $Ru—Cs_2O—Al_2O_3$ = 0.5:5:94.5) with different sorts of alkali metal from the catalyzer (1), were prepared in the same process as the catalyzer (1) to obtain catalyzers (6), (7) and (8).

Calcium nitrate or barium nitrate ($Ru—CaO—Al_2O_3$ = 0.5:5:94.5 or $Ru—BaO—Al_2O_3$ = 0.5:5:94.5) were used in place of potassium nitrate in the same process as the catalyzer (1) to obtain catalyzers (9) and (10).

Magnesium oxide (made by Kanto Chemicals, Special grade chemical) ($Ru—K_2O—MgO$ = 0.5:5:94.5) instead of alumina, was prepared in the same process as the catalyzer (1) to obtain a catalyzer (11).

Iron nitrate ($Fe(NO_3)_3.9H_2O$) of 20.3 g was dissolved in water of about 200 ml, and alumina of 97.2 g was supplied thereto and prepared in the same process as the catalyzer (1) to obtain a catalyzer of a comparative example (b).

Nickel nitrate ($Ni(NO_3)_3.6H_2O$) of 99.1 g was dissolved in the water of about 200 ml, and silica alumina of 80.0 g (made by Nikki Chemicals.N631L) was supplied thereto and prepared in the same process as the catalyzer (1) to obtain a catalyzer of a comparative example (c).

Chloroplatinic acid ($H_2PtCl_6.6H_2O$) of 0.530 g was dissolved in water of about 200 ml, and alumina of 99.5 g was supplied thereto and prepared in the same process as the catalyzer (1) to obtain a catalyzer of a comparative example (e).

(2) The decomposition of ammonia

Each of the above stated catalyzers was placed in a tubular reactor made of quartz, and a gaseous mixture of ammonia and helium of $NH_3/He$ ratio being 1.0 was supplied at a prescribed reaction temperature and at the flowing velocity of 100 ml/min, under the atmospheric pressure, and reacted. The space velocity as 1000 ml/ml.h on the basis of ammonia.

Reaction products and unreacted ammonia recovered by the above operations were analyzed by a gas chromatograph. Results will be shown in Table.

The reaction products were nitrogen and hydrogen only. With respect to the formation rates thereof, nitrogen was 0.5 times and hydrogen was 1.5 times of the decomposition rate of ammonia (the number of moles ammonia converted per unit volume of catalyzer and unit time).

As apparent from Table, the catalyzers (1) to (11) exhibit the high activity for the decomposition of ammonia and remarkable effects at the low temperature of not more than 500° C. in comparison with the examples (a), (b), (c) and (d).

Having explained heretofore, the ammonia decomposition catalyzers according to the invention give the high ammonia decomposition activities at the low temperatures of not more than 500° C. and the remarkable effects.

TABLE

| No. | Catalyzers ( ): Weight Ratio | Ammonia conversion (%) at reaction temperatures | | | | | |
|---|---|---|---|---|---|---|---|
| | | 350° C. | 380° C. | 400° C. | 450° C. | 500° C. | 550° C. |
| Catalyzer (1) | $Ru—K_2O—Al_2O_3$ (0.5:5:94.5) | 31.8 | 59.0 | 78.0 | 98.2 | 100 | 100 |
| Comparative Example (a) | $Ru—Al_2O_3$ (0.5:99.5) | — | — | 21.1 | 57.5 | 83.5 | 91.2 |
| Catalyzer (2) | $Ru—K_2O—Al_2O_3$ (0.5:2:97.5) | — | 23.6 | 38.2 | 80.2 | 92.6 | 100 |
| Catalyzer (3) | $Ru—K_2O—Al_2O_3$ (0.5:10:89.5) | 29.2 | 50.1 | 69.5 | 89.7 | 100 | 100 |
| Catalyzer (4) | $Ru—K_2O—Al_2O_3$ (0.1:5:94.9) | — | 32.0 | 43.4 | 75.3 | 94.7 | 100 |
| Catalyzer (5) | $Ru—K_2O—Al_2O_3$ (2:5:93) | 31.3 | 55.3 | 74.8 | 91.3 | 100 | 100 |
| Catalyzer (6) | $Ru—Li_2O—Al_2O_3$ (0.5:5:94.5) | — | — | 24.4 | 59.5 | 88.9 | 100 |
| Catalyzer (7) | $Ru—Na_2O—Al_2O_3$ (0.5:5:94.5) | 21.8 | 43.6 | 64.1 | 100 | 100 | 100 |
| Catalyzer (8) | $Ru—Cs_2O—Al_2O_3$ (0.5:5:94.5) | — | 21.0 | 37.0 | 77.2 | 94.3 | 100 |
| Catalyzer (9) | $Ru—CaO—Al_2O_3$ (0.5:5:94.5) | — | 21.1 | 31.9 | 77.2 | 100 | 100 |
| Catalyzer (10) | $Ru—BaO—Al_2O_3$ (0.5:5:94.5) | — | 28.0 | 40.7 | 77.0 | 88.0 | 100 |
| Catalyzer (11) | $Ru—K_2O—MgO$ | 22.9 | 42.7 | 62.3 | 100 | 100 | 100 |

TABLE -continued

| No. | Catalyzers ( ): Weight Ratio | Ammonia conversion (%) at reaction temperatures | | | | | |
|---|---|---|---|---|---|---|---|
| | | 350° C. | 380° C. | 400° C. | 450° C. | 500° C. | 550° C. |
| Comparative Example (b) | (0.5:5:94.5) Fe—$Al_2O_3$ (2.8:97.2) | — | — | 1.2 | — | 5.4 | — |
| Comparative Example (c) | Ni—$SiO_2.Al_2O_3$ (20:80) | — | 7.4 | 19.9 | 47.7 | 83.4 | 95.7 |
| Comparative Example (d) | Pt—$Al_2O_3$ (0.5:99.5) | — | — | 1.1 | — | 1.8 | 1.9 |

INDUSTRIAL APPLICABILITY

As the ammonia decomposition catalyzers of the invention can decompose ammonia into hydrogen and nitrogen effectively, they decompose ammonia recovered from COG, whereby it is possible to produce an atmospheric gas to be used to the bright annealing of stainless steels and nickel steels by means of hydrogen gas obtained by said decomposition.

What is claimed is:

1. A process for decomposing ammonia wherein a catalyzer is utilized, said catalyzer consisting essentially of a mixture of a basic compound in an amount of 1 to 20 weight percent and ruthenium in an amount of 0.1 to 2.0 weight percent which is impregnated into an alumina carrier and then calcinated and reduced, wherein the ammonia is decomposed at a temperature of not more than 500° C., said basic compound being an oxide, a carbonate, a hydroxide, a nitrate or an acetate of an alkali metal or an alkaline earth metal.

2. The process of claim 1, wherein the basic compound is added after impregnating ruthenium.

3. The process of claim 1, wherein the basic compound is added when said ruthenium is being impregnated.

4. The process of claim 3, wherein the ruthenium is selected from the group consisting of ruthenium chloride, ruthenium nitrate, ruthenium acetate and ruthenium carbonyl.

5. The process of claim 1, wherein the alumina carrier comprises oxides, carbonates of alkaline earth metals, or mixed oxide compounds of alumina, silica gel, or titania together with said oxides and carbonate.

6. The process of claim 1, wherein the catalyzer is dried in air at a temperature of 90° to 150° C. for a period of from 12 to 36 hours.

* * * * *